US012181768B2

United States Patent
Paolini, Jr. et al.

(10) Patent No.: US 12,181,768 B2
(45) Date of Patent: Dec. 31, 2024

(54) LIGHT-TRANSMISSIVE CONDUCTOR WITH DIRECTIONAL CONDUCTIVITY

(71) Applicant: E INK CORPORATION, Billerica, MA (US)

(72) Inventors: Richard J. Paolini, Jr., Framingham, MA (US); Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 885 days.

(21) Appl. No.: 17/032,002

(22) Filed: Sep. 25, 2020

(65) Prior Publication Data

US 2021/0018813 A1    Jan. 21, 2021

Related U.S. Application Data

(63) Continuation-in-part of application No. 16/585,218, filed on Sep. 27, 2019, now Pat. No. 11,656,525.

(Continued)

(51) Int. Cl.
*G02F 1/16757*    (2019.01)
*D03D 15/54*    (2021.01)
*G02F 1/167*    (2019.01)

(52) U.S. Cl.
CPC ......... *G02F 1/16757* (2019.01); *D03D 15/54* (2021.01); *G02F 1/167* (2013.01); *D10B 2401/20* (2013.01)

(58) Field of Classification Search
CPC ............ G02F 1/1333; G02F 1/133528; G02F 1/13439; G02F 1/0009; G02F 1/1334; G02F 2202/28; G02F 1/13338; G02F 1/1335; G02F 1/13363; G02F 1/133638; G02F 2201/50; G02F 2413/01; G02F 2413/05; G02F 1/133305; G02F 1/167; G02F 1/133308; G02F 1/133345; G02F 1/16757; G02F 1/1309; G02F 1/136227;
(Continued)

(56) References Cited

U.S. PATENT DOCUMENTS 3,852,401 A    12/1974  Suzuki et al.
4,659,619 A     4/1987  Tate
(Continued)

FOREIGN PATENT DOCUMENTS

CN    1807707 A     7/2006
CN  105261423 A     1/2016
(Continued)

OTHER PUBLICATIONS

Wood, D., "An Electrochromic Renaissance?" Information Display, 18(3), 24 (Mar. 2002).
O'Regan, B. et al., "A Low Cost, High-efficiency Solar Cell Based on Dye-sensitized colloidal TiO2 Films", Nature, vol. 353, pp. 737-740 (Oct. 24, 1991).
(Continued)

*Primary Examiner* — Brandi N Thomas
(74) *Attorney, Agent, or Firm* — Brian D. Bean

(57) ABSTRACT

Light-transmissive conductors including oriented conductors disposed in a light-transmissive polymer having a volume resistivity between $1\times10^{10}$ ohm-cm and $1\times10^{4}$ ohm-cm. The oriented conductors typically have very high conductivity along their length. Light-transmissive conductors described herein are well-suited for front electrodes for electro-optic displays, especially elongated displays in the shape of ribbons, stripes, or rulers.

1 Claim, 5 Drawing Sheets

Related U.S. Application Data

(60) Provisional application No. 63/004,430, filed on Apr. 2, 2020, provisional application No. 62/739,684, filed on Oct. 1, 2018.

(58) Field of Classification Search
CPC .... G02F 1/136254; G02F 1/1676; G02F 1/13; G02F 1/133707; G02F 1/13394; G02F 1/134318; G02F 1/134363; G02F 1/136222; G02F 1/13793; G02F 1/132; G02F 1/133514; G02F 1/1339; G02F 1/1343; G02F 1/134309; G02F 1/134372; G02F 1/1345; G02F 1/136; G02F 1/1368; G02F 1/13718; G02F 1/13775; G02F 1/1533; G02F 1/1677; G02F 1/172; B32B 27/18; B32B 27/08; B32B 2307/202; B32B 23/08; B32B 2307/42; B32B 2457/208; B32B 27/325; B32B 7/023; B32B 7/02; B32B 27/36; B32B 15/09; B32B 15/20; B32B 17/10; B32B 2255/10; B32B 2255/26; B32B 2307/212; B32B 2307/412; B32B 2307/518; B32B 2307/54; B32B 2307/5825; B32B 2307/7145; B32B 2307/72; B32B 2307/7242; B32B 2367/00; B32B 2439/70; B32B 27/00; B32B 5/02; G06F 3/0412; G06F 3/041; G06F 3/044; G06F 3/045; G06F 3/0354; G06F 3/046; G06F 3/0443

See application file for complete search history.

(56) References Cited

U.S. PATENT DOCUMENTS

| | | |
|---|---|---|
| 4,756,958 A | 7/1988 | Bryant et al. |
| 4,815,355 A | 3/1989 | Cavaness |
| 4,917,920 A | 4/1990 | Ono et al. |
| 5,760,761 A | 6/1998 | Sheridon |
| 5,777,782 A | 7/1998 | Sheridon |
| 5,808,783 A | 9/1998 | Crowley |
| 5,961,804 A | 10/1999 | Jacobson |
| 6,017,584 A | 1/2000 | Albert et al. |
| 6,054,071 A | 4/2000 | Mikkelsen, Jr. |
| 6,055,091 A | 4/2000 | Sheridon |
| 6,072,619 A | 6/2000 | Kiryuschev et al. |
| 6,097,531 A | 8/2000 | Sheridon |
| 6,120,588 A | 9/2000 | Jacobson |
| 6,120,839 A | 9/2000 | Comiskey et al. |
| 6,128,124 A | 10/2000 | Silverman |
| 6,137,467 A | 10/2000 | Sheridon et al. |
| 6,147,791 A | 11/2000 | Sheridon |
| 6,241,921 B1 | 6/2001 | Jacobson et al. |
| 6,262,706 B1 | 7/2001 | Albert et al. |
| 6,262,833 B1 | 7/2001 | Loxley et al. |
| 6,300,932 B1 | 10/2001 | Albert |
| 6,301,038 B1 | 10/2001 | Fitzmaurice et al. |
| 6,323,989 B1 | 11/2001 | Jacobson et al. |
| 6,377,387 B1 | 4/2002 | Duthaler et al. |
| 6,515,649 B1 | 2/2003 | Albert et al. |
| 6,538,801 B2 | 3/2003 | Jacobson et al. |
| 6,542,284 B2 | 4/2003 | Ogawa |
| 6,580,545 B2 | 6/2003 | Morrison et al. |
| 6,652,075 B2 | 11/2003 | Jacobson |
| 6,693,620 B1 | 2/2004 | Herb et al. |
| 6,721,083 B2 | 4/2004 | Jacobson et al. |
| 6,727,881 B1 | 4/2004 | Albert et al. |
| 6,756,120 B2 | 6/2004 | Smith et al. |
| 6,822,782 B2 | 11/2004 | Honeyman |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,006,063 B2 | 2/2006 | Maeda |
| 7,012,600 B2 | 3/2006 | Zehner et al. |
| 7,012,735 B2 | 3/2006 | Honeyman et al. |
| 7,038,655 B2 | 5/2006 | Herb et al. |
| 7,075,502 B1 | 7/2006 | Drzaic et al. |
| 7,116,318 B2 | 10/2006 | Amundson et al. |
| 7,170,670 B2 | 1/2007 | Webber |
| 7,173,752 B2 | 2/2007 | Doshi et al. |
| 7,180,649 B2 | 2/2007 | Morrison et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,312,784 B2 | 12/2007 | Baucom et al. |
| 7,312,916 B2 | 12/2007 | Pullen et al. |
| 7,321,459 B2 | 1/2008 | Masuda et al. |
| 7,339,715 B2 | 3/2008 | Webber et al. |
| 7,342,068 B2 | 3/2008 | Klingenberg et al. |
| 7,375,875 B2 | 5/2008 | Whitesides et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,453,445 B2 | 11/2008 | Amundson |
| 7,531,235 B2 | 5/2009 | Den Toonder et al. |
| 7,532,388 B2 | 5/2009 | Whitesides et al. |
| 7,535,624 B2 | 5/2009 | Amundson et al. |
| 7,579,078 B2 | 8/2009 | Hartmann et al. |
| 7,679,814 B2 | 3/2010 | Paolini, Jr. et al. |
| 7,746,544 B2 | 6/2010 | Comiskey et al. |
| 7,839,564 B2 | 11/2010 | Whitesides et al. |
| 7,848,006 B2 | 12/2010 | Wilcox et al. |
| 7,903,319 B2 | 3/2011 | Honeyman et al. |
| 8,009,348 B2 | 8/2011 | Zehner et al. |
| 8,018,640 B2 | 9/2011 | Whitesides et al. |
| 8,047,681 B2 | 11/2011 | Howng et al. |
| 8,107,153 B2 | 1/2012 | Sotzing et al. |
| 8,115,729 B2 | 2/2012 | Danner et al. |
| 8,199,395 B2 | 6/2012 | Whitesides et al. |
| 8,207,511 B2 | 6/2012 | Bortz et al. |
| 8,270,064 B2 | 9/2012 | Feick et al. |
| 8,282,232 B2 | 10/2012 | Hsu et al. |
| 8,305,341 B2 | 11/2012 | Arango et al. |
| 8,319,759 B2 | 11/2012 | Jacobson et al. |
| 8,390,918 B2 | 3/2013 | Wilcox et al. |
| 8,446,664 B2 | 5/2013 | Chen et al. |
| 8,582,196 B2 | 11/2013 | Walls et al. |
| 8,593,718 B2 | 11/2013 | Comiskey et al. |
| 8,769,836 B2 | 7/2014 | Donovan et al. |
| 9,244,326 B2 | 1/2016 | Zhou et al. |
| 9,366,935 B2 | 6/2016 | Du et al. |
| 9,372,380 B2 | 6/2016 | Du et al. |
| 9,441,122 B2 | 9/2016 | Zhou et al. |
| 9,478,535 B2 | 10/2016 | Yamazaki et al. |
| 9,529,240 B2 | 12/2016 | Paolini, Jr. et al. |
| 9,633,579 B2 | 4/2017 | McLeod et al. |
| 9,752,034 B2 | 9/2017 | Wu et al. |
| 9,777,201 B2 | 10/2017 | Widger et al. |
| 9,835,913 B2 * | 12/2017 | Pellerite ............ G02F 1/133345 |
| 9,863,920 B2 | 1/2018 | Gaynor et al. |
| 9,921,451 B2 | 3/2018 | Telfer et al. |
| 10,151,955 B2 | 12/2018 | Paolini, Jr. et al. |
| 10,174,232 B2 | 1/2019 | Bzowej et al. |
| 10,372,008 B2 | 8/2019 | Telfer et al. |
| 2001/0009352 A1 | 7/2001 | Moore |
| 2003/0194578 A1 | 10/2003 | Tam et al. |
| 2005/0012980 A1 | 1/2005 | Wilcox et al. |
| 2007/0197115 A1 | 8/2007 | Eves et al. |
| 2008/0316580 A1 | 12/2008 | Gillies et al. |
| 2009/0009852 A1 | 1/2009 | Honeyman et al. |
| 2009/0206499 A1 | 8/2009 | Whitesides et al. |
| 2009/0225398 A1 | 9/2009 | Duthaler et al. |
| 2010/0148385 A1 | 6/2010 | Balko et al. |
| 2010/0245971 A1 * | 9/2010 | Sotzing ................ D03D 15/292 359/265 |
| 2011/0073353 A1 | 3/2011 | Lee et al. |

(56) References Cited

U.S. PATENT DOCUMENTS

| | | | |
|---|---|---|---|
| 2012/0274616 A1 | 11/2012 | Scribner et al. | |
| 2014/0011913 A1 | 1/2014 | Du et al. | |
| 2015/0205178 A1* | 7/2015 | Paolini, Jr. | G02F 1/167 359/238 |
| 2016/0062259 A1* | 3/2016 | Miyagawa | G03G 15/0233 399/176 |
| 2018/0271180 A1 | 9/2018 | Kim et al. | |
| 2018/0363173 A1 | 12/2018 | Keating et al. | |
| 2020/0103720 A1 | 4/2020 | Anseth et al. | |

FOREIGN PATENT DOCUMENTS

| | | |
|---|---|---|
| JP | 2004070206 A | 3/2004 |
| JP | 2010238646 A | 10/2010 |
| KR | 20180013007 A1 | 7/2018 |
| TW | 200916620 A | 4/2009 |
| TW | 201211339 A | 3/2012 |
| TW | M531957 U | 11/2016 |

OTHER PUBLICATIONS

Bach, Udo. et al., "Nanomaterials-Based Electrochromics for Paper-Quality Displays", Adv. Mater, vol. 14, No. 11, pp. 345-348, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

European Patent Office, PCT/US2018/036772, International Search Report and Written Opinion, Sep. 19, 2018.

Korean Intellectual Property Office, PCT/US2019/053388, International Search Report and Written Opinion, Jan. 16, 2020.

Korean Intellectual Property Office, PCT/US2020/052610, International Search Report and Written Opinion, Jan. 8, 2021.

European Patent Office, "Extended European Search Report", EP Appl. No. 20868339.1 , Jul. 21, 2023.

\* cited by examiner

LIGHT-TRANSMISSIVE CONDUCTOR WITH DIRECTIONAL CONDUCTIVITY

RELATED APPLICATIONS

This application claims priority to U.S. Provisional Application No. 63/004,430, filed Apr. 2, 2020. This application additionally is a continuation-in-part of U.S. patent application Ser. No. 16/585,218, filed Sep. 27, 2019, which claims priority to U.S. Provisional Patent Application No. 62/739,684, filed Oct. 1, 2018. All patents, published applications, and references disclosed herein are incorporated by reference in their entireties.

BACKGROUND

In a reflective display media the majority of images are created using only reflected ambient light. Accordingly, it is important to minimize the light losses in the optical pathway between the illumination source, e.g., the sun, and the reflective medium. This is especially important for the film that makes up the front electrode, through which the light passes twice before it reaches the observer. For example, 5 mil thick commercial indium tin oxide (ITO) coated polyethylene terephthalate (PET), having a conductivity of 300 ohm/sq, has a transmission spectrum for visible light of around 85% for a single pass. Thus, after a double pass through the film the transmission will actually be down $(0.85)^2$, or 72%. In other words, more than a fourth of the incident light "disappears" from the viewer on its trip from the source to the medium to the viewer's eyes.

Such transmission losses are detrimental to all types of reflective electro-optic displays because before losses from the display media are even factored in, almost 30% of the light might be lost. Thus, in many cases, it is necessary to supplement the reflective medium with a front light that provides a "boost" in the light hitting the reflective medium. Such front lights are common on eReaders, watches, thermostats, etc.

In addition to being lossy, PET-ITO is prone to cracking when flexed, making it unsuitable for many applications that require a flexible transparent conductor. There are many novel electrode materials for electrodes being developed as replacements for ITO, but thus far, many are too expensive for commercial manufacture or insufficiently robust for consumer products. Some of these light-transmissive materials are dispersions of small conductors (silver filings or whiskers) in a polymeric binder, where the binder provides continuity of conductivity as well as flexibility and mechanical strength. For example, see U.S. Pat. No. 9,529,240, which is incorporated by reference in its entirety. In most cases, the binder is an electronic insulator, thus resulting in inhomogeneities in electric fields between the light-transmissive composite electrode and another electrode in the system, such as a backplane conductor. When such light-transmissive composite electrodes are used with an electrophoretic media, such as sold by E Ink Corporation, the inhomogeneities cause transient state-switching issues typically known as "self-erasing," whereby portions of an updated image disappear after being updated to the display. The inhomogeneities can be improved by increasing the amount of small conductors in the formulation, however as the amount of dispersed conductor increases, the transmission of the ultimate light-transmissive conductive layer decreases.

The requirements for a suitable light-transmissive conductor become more complex when there is a high aspect ratio in the shape of the conductor. That is, when the length-to-width ratio (aspect ratio) is above 10:1, e.g., 20:1, e.g., 50:1, e.g., 100:1. Such aspect ratios are common in elongated display segments, such as shelf running signs, ribbons, fibers, or architectural design elements, such as pinstripes. In such applications, the minimal sheet resistance of, e.g., of ITO-coated PET (300 ohm/sq), becomes significant enough to dramatically increase the amount of power required to actuate the display. This leads to more failures in such devices and requires more expensive power management components. Furthermore, many of the high-aspect-ratio applications (e.g., ribbons) require a higher amount of flexibility, which is also difficult to achieve with available light-transmissive conductors.

SUMMARY

Accordingly, the invention described herein provides a light-transmissive conductor with directional conductivity. In preferred embodiments, the conductivity along the length of the material is approaching a conductive material, e.g., less than $1 \times 10^{-3}$ Ohm-cm. [It is to be appreciated that quoted volume resistivities are with respect to standard relative humidity (50% RH) and temperature (20° C.)].

In a first aspect the invention includes a light-transmissive conductor including a light-transmissive polymer having a volume resistivity between $1 \times 10^{10}$ ohm-cm and $1 \times 10^4$ ohm-cm, and an oriented conductive element having an aspect ratio of greater than 10:1 (length:width). In some embodiments, the light-transmissive polymer is flexible, thereby allowing the light-transmissive conductor to be flexible. In some embodiments, the light-transmissive polymer is doped with a conductive additive, such as a salt, a polyelectrolyte, a polymer electrolyte, or a solid electrolyte. In some embodiments, the oriented conductive element is a wire or conductive fiber. In other embodiments, the oriented conductive element comprises a plurality of conductive flakes, threads, slivers, whiskers, nanowires, or nanotubes oriented to achieve an aspect ratio greater than 10:1. Such materials may include carbon nanotubes, silver, tungsten, iron, copper, nanoparticles, metallic grids, or graphene. In some embodiments, the oriented conductive element has an aspect ratio of greater than 100:1. In some embodiments, the visible light transmission of the light-transmissive polymer is greater than 70%. All of the preceding features can be incorporated into light-transmissive films that are less than 500 μm thick.

In a second aspect the invention includes an electro-optic display comprising a front electrode comprising a layer of a light-transmissive conductor of the invention, a back electrode, a layer of electro-optic media disposed between the front electrode and the back electrode, and a voltage source coupled to the front and back electrodes. The light-transmissive conductor will include a light-transmissive polymer having a volume resistivity between $1 \times 10^{10}$ ohm-cm and $1 \times 10^4$ ohm-cm and an oriented conductive element having an aspect ratio of greater than 10:1 (length:width). In some embodiments, the layer of electro-optic media comprises charged pigment particles in a solvent. In some embodiments, the charged pigment particles and the solvent are enclosed in microcapsules or sealed in microcells. The charged pigment particles may comprise two sets of charged pigment particles, wherein each set has a different charge polarity and a different optical characteristic. In some embodiments, the electro-optic display includes an optically-clear adhesive between the front electrode and the layer of electro-optic media.

In a third aspect, the invention includes a color-changing fiber comprising, a central conductive element, a layer of electro-optic media surrounding the central conductive element, and an outer layer of a light-transmissive conductor of the invention, i.e., including a light-transmissive polymer having a volume resistivity between $1\times10^{10}$ ohm-cm and $1\times10^{4}$ ohm-cm, and an oriented conductive element having an aspect ratio of greater than 10:1 (length:width). In some embodiments, the electro-optic media comprises charged pigment particles in a solvent. In some embodiments, the charged pigment particles are enclosed in microcapsules and dispersed in a polymer binder.

In a fourth aspect, the invention includes a method of making a light-transmissive conductor of the invention comprising providing a light-transmissive polymer having a volume resistivity between $1\times10^{10}$ ohm-cm and $1\times10^{4}$ ohm-cm, and disposing an oriented conductive element having an aspect ratio of greater than 10:1 (length:width) into the light-transmissive polymer. In some embodiments, the method further comprises disposing a plurality of oriented conductive elements into the light-transmissive polymer, orienting the plurality of oriented conductive elements with an external stimulus, and curing the light-transmissive polymer. The external stimulus may be a magnetic field, an electric field, light, or mechanical actuation. In some embodiments the resulting light-transmissive conductor has a conductivity of less than $1\times10^{-3}$ Ohm-cm along the direction in which the plurality of oriented conductive elements are oriented.

These and other aspects of the present invention will be apparent in view of the following description.

BRIEF DESCRIPTION OF THE FIGURES

The Figures depict one or more implementations in accord with the present concepts, by way of example only, not by way of limitations. The drawings are not to scale. In the figures, like reference numerals refer to the same or similar elements.

DETAILED DESCRIPTION

Figure 1:
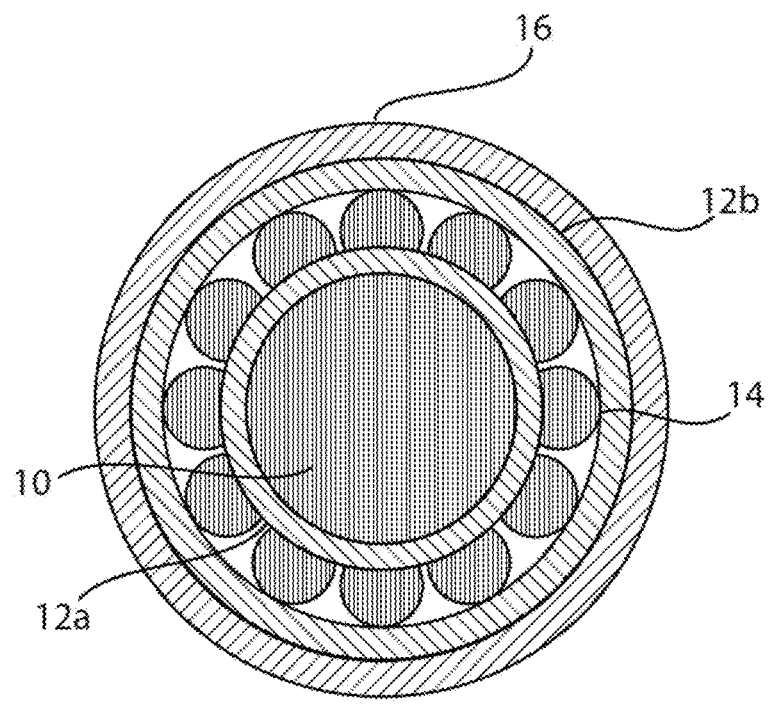
FIG. 1 is a cross-sectional view of an electro-optic fiber according to a first embodiment of the present invention.

Light-transmissive conductors described herein have conductivity similar to "normal" metallic conductivity in the longer direction, but are not normally conductive in the transverse direction. Accordingly, light-transmissive conductors of the invention avoid electrical transients that result in self-erasing and other unwanted phenomena in electro-optic displays. These features are achieved by including oriented conductors in a light-transmissive polymer having a volume resistivity between $1\times10^{10}$ ohm-cm and $1\times10^{4}$ ohm-cm. The oriented conductors typically have very high conductivity, metallic like, and they may be opaque, thereby requiring 80% or greater open spaces between the conductors to allow the macroscopic appearance of a transparent conductor. Exemplary materials include carbon nanotubes, metallic nanowires like silver, tungsten, stainless steel or copper, printed metal nanoparticles, metallic grids, graphene. The arrangement can be simple wires oriented only in the fiber direction, or they can have continuous conductivity in the fiber direction and also some lateral conductivity.

The light-transmissive polymer (a.k.a. polymeric blooming binder layer) is a doped polymeric layer that fills in the spaces between the conductor regions of the composite transparent electrode. This layer is transparent. Typically, the resulting light-transmissive conductor is between 5 and 50 microns in thickness. The function of the light-transmissive polymer is to allow the individual oriented conductors to be spaced out wide enough to have the resulting light-transmissive conductor approach more than 80% visible light transmission while allowing the electrical driving signals in the wires to share some amount of conductivity between the oriented conductors, but neither fully conductive or fully insulating.

This oriented composite transparent electrode of the invention could be used as the viewing electrode of an electrophoretic display. The electrode could have the electrophoretic media coated or laminated to the electrode with a variety of standard procedures described in previous E Ink patents to create multiple structures including but not limited to the following simple ink stacks shown in the figures below.

In the following detailed description, numerous specific details are set forth by way of examples in order to provide a thorough understanding of the relevant teachings. However, it should be apparent to those skilled in the art that the present teachings may be practiced without such details.

The term "electro-optic", as applied to a material, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, or luminescence.

The light-transmissive polymeric material may be any polymeric material that fulfills the particular needs of the end-use application. Examples of suitable polymeric materials include polyurethane, vinyl acetate, vinyl acetate ethylene, epoxy, a polyacrylic-based adhesive, or combinations thereof. These adhesive materials may be solvent based or aqueous based. An example of a particular polyurethane that may be used is described in U.S. Pat. No. 7,342,068, issued Mar. 11, 2008, which is incorporated herein by reference in its entirety and assigned to Air Products and Chemicals, Inc.

The light-transmissive polymeric material may, itself, be a composite, for example an ionic conductive polymer in which one ion can migrate through the polymeric material while the other cannot. This type of ionic material prevents ions diffusing out of the polymeric material and potentially damaging other layers (for example, organic semiconductor layers) into which the ions diffuse.

It is desirable that the ionic material be chosen such that the conductivity of the final polymeric material after drying can be modified and adjusted by varying the carboxylic acid content of the polyurethane, and also by the cation used. For example, a carboxylic group on the polyurethane may be neutralized with a quaternary ammonium hydroxide, at a given carboxylic acid content, the conductivity would be expected to increase in the order: tetramethylammonium<tetraethylammonium<tetrabutylammonium, etc. Phosphonium salts could also be used, and should be somewhat more conductive than the nitrogen containing analogs because of the larger size of the central atom. Other cationic species (e.g., complex ions of metals) may also be useful for this purpose. Solubility of the ionic material in the polymer material is not an issue in this approach, since the ions are an intrinsic part of the medium and cannot therefore phase separate as a separate crystalline phase.

The acidic component of the polymeric material may also be made more acidic by replacing a carboxylic acid component by a group with a higher dissociation constant, for example, a sulfate monoester, sulfonic acid, sulfinic acid, a phosphonic acid, phosphinic acid group or phosphate ester, as long as there is at least one dissociable proton present. Quaternary salts and other large cations would still be expected to be most useful as counter ions because of their large size, and relatively high degree of ionic dissociation in dried adhesive media of low polarity. Nitrogen-based acids could also be used if attached to sufficiently electron-withdrawing functions (e.g., $RSO_2$—NH—$SO_2R$)). In this case almost any mobile ion could be used, including tertiary ammonium, because the mobile ion will exist in the protonated form even in the dried adhesive. However, mobile ions based on larger amines (i.e., ones with longer alkyl tails) might still be preferable, because they are effectively larger in size and therefore the ion pairs comprising them would be more dissociable. Alternatively, a carboxylate group on the polymer could be used with a mobile ion that is not a strong Bronsted acid, i.e., which does not have an acidic proton, such as the quaternary cations discussed above.

Polymeric materials in which a cation is the fixed ion can be constructed by using quaternary ammonium groups in the polymer backbone or as side chains, and preferably using large anions (e.g., hexafluorophosphate, tetrabutylborate, tetraphenylborate, etc.) as the mobile ions. The quaternary ammonium groups could be replaced by phosphonium, sulfonium or other cationic groups without dissociable hydrogen, including those formed by complexation with metallic cations. Examples of the latter include polyether/lithium ion inclusion complexes, especially cyclic polyethers (e.g. 18-crown-6) or polyamine complexes with transition metal ions. In this case the anionic mobile ion could include those types of ions listed above, plus more strongly basic materials such as carboxylates or even phenolates.

Alternative fixed cation polymeric materials include polymers containing repeating units derived from basic monomers, for example poly(vinylpyridine), poly(β-dimethylaminoethyl acrylate), etc. and copolymers containing such groups, in conjunction with mobile anions that are not good Brönsted acceptors (e.g., sulfonates, sulfates, hexafluorophosphate, tetrafluoroborate, bis(methanesulfonyl)imidate, phosphates, phosphonates, etc.). Quaternary salts derived from such amino monomers may also be used, for example, poly(N-methyl or benzyl(vinylpyridinium)), poly(N-alkyl (or alkaryl)-N'-vinylimidazolium), and poly(β-trimethylammonioethyl)acrylate or methacrylate) salts, as well as vinyl copolymers comprising these ionic groups. As before, larger mobile ions are preferred.

These chemical modification techniques are not restricted to polyurethanes but can be applied to any polymer of suitable structure. For example, vinyl-based polymers can contain either anions or cation fixed ions. In another form of the present invention, the polymeric material may contain one or more conducting polymers selected from PEDOT-PSS, polyacetylene, polyphenylene sulfide, polyphenylene vinylene and combinations thereof.

The light-transmissive polymer may alternatively or additionally include ionic additives, for example, (a) a salt, a polyelectrolyte, a polymer electrolyte, a solid electrolyte, and combinations thereof; or (b) a non-reactive solvent, a conductive organic compound, or combinations thereof.

In one form, the additive may be a salt such as an inorganic salt, organic salt, or combination thereof, as described in U.S. Pat. No. 7,012,735, filed Mar. 26, 2004, assigned to E Ink Corporation. Exemplary salts include potassium acetate, and tetraalkylammonium salts, especially tetrabutylammonium salts such as the chloride. Further examples of salts include salts such as $RCF_3SOF_3$, $RClO_4$, $LiPF_6$, $RBF_4$, $RAsF_6$, $RB(Ar)_4$ and $RN(CF_3SO_2)_3$ where R may be any cation, such as $Li^+$, $Na^+$, $H^+$, or $K^+$. Alternatively, R may include ammonium groups of the form $N^+R_1R_2R_3R_4$. A preferred salt is tetrabutylammonium hexafluorophosphate.

In another form, the additive may be a salt having anions containing at least three fluorine atoms as described in U.S. Pat. No. 8,446,664, filed Apr. 4, 2011, assigned to E Ink Corporation. The salt may, for example, have a hexafluorophosphate anion. The salt may also have an imidazolium cation. Exemplary salts include 1-butyl-3-methylimidazolium hexafluorophosphate (hereinafter "BMIHFP"), 1-butyl-3-methylpiperidinium hexafluorophosphate, 1-butyl-3-methylpyridinium hexafluorophosphate, 1-ethyl-3-methylimidazolium hexafluorophosphate, sodium hexafluorophosphate, 1-butyl-3-methylimidazolium trifluoromethanesulfonate and 1-butyl-3-methylimidazolium boron tetrafluoride. A preferred salt is BMIHFP. This preferred salt is liquid at 25° C. and can be dispersed directly in an aqueous polymer dispersion or latex without the use of any solvent. Alternatively, since the preferred salt is soluble in water in an amount of about 1 percent at 25° C., this salt can be added in the form of a dilute aqueous solution. Addition of the salt as an aqueous solution avoids the introduction of any undesirable organic solvent into the binder.

Alternatively, the fluorine-containing salt may have a tetrafluoroborate anion, a tetraphenylborate anion, a bis(trifluoromethane)sulfonamide anion ("triflimide"), a tetra (pentafluorophenyl)borate anion, a tetrakis(3,5-bis(trifluoromethyl)phenyl)borate anion or a trifluoromethanesulfonate anion ("triflate"), for example, 1-butyl-3-methylimidazolium boron tetrafluoride or 1-butyl-3-methylimidazolium trifluoromethanesulfonate. The fluorine-containing salt may be present in an amount of from about 50 to about 10,000 ppm based upon the solids content of the polymeric material, and generally from about 100 to about 1000 ppm.

In other embodiments, the polymer electrolyte is a polyelectrolyte. Polyelectrolytes are typically polymers in which about 10% or more of the molecule is composed of a functional group capable of ionizing to form a charged species. Examples of certain functional groups within a polyelectrolyte include, but are not limited to, carboxylic acids, sulfonic acids, phosphoric acids, and quaternary ammonium compounds. These polymers can be combined with organic or inorganic salts or alternatively used alone. Examples of polyelectrolytes, include but are not limited to, polyacrylic acid, polystyrene sulfonate, poly(2-vinylpyridine), poly(4-vinylpyridine), poly(dimethylammonium chloride, poly(dimethylaminoethyl methacrylate), poly(diethylaminoethyl methacrylate) and may comprise a salt of a polyacid such as, but not limited to, an alkali metal salt of polyacrylic acid. A preferred polyelectrolyte is the sodium salt of polyacrylic acid.

The optimum amount of polymeric additive will of course vary widely with the base polymeric material and the exact additive used, and the desired volume resistivity of the final mixture. However, by way of general guidance it may be indicated that a concentration of from about $10^{-5}$ to about $10^{-4}$ moles of additive per gram of polymeric material has been found to give useful results. When the additive is a salt, this range is for 1:1 salts such as tetrabutylammonium chloride, tetrabutylammonium hexafluorophosphate and potassium acetate; if 1:2 salts such as sodium carbonate or calcium chloride are used, lower concentrations, of the order of $10^{-6}$ moles of salt per gram of polymeric material may suffice. The volume resistivity of polymeric materials typically varies in a predictable manner with the concentration of the additive, and hence the final choice of how much additive should be added to achieve a desired volume resistivity may readily be determined empirically.

Although small amounts of salts have been added to polymers used as binders and lamination adhesives in prior art electro-optic displays, for example as biocides to protect the polymers from biological degradation during extended storage, such salts are typically used up during storage as they perform their biocidal or similar function. In contrast, the additives used in the present invention are intended to be permanent constituents of the polymeric material since they are intended to effect a permanent adjustment in the conductivity thereof. Also, the optimum amounts of additives used are typically substantially greater than the amounts of salts used as biocides etc.

Examples of fibers including a light-transmissive conductor of the invention are shown in FIGS. 1-6B. Referring now specifically to FIG. 1, a cross-sectional view of an electro-optic fiber according to a first embodiment is illustrated. The fiber comprises a central conductive core 10 in the form of a fiber or wire. The central conductive fiber 10 preferably has a large aspect ratio, e.g., 10:1, e.g., 100:1, so that the fiber will remain flexible after having been coated with various layers. For example, the central conductive fiber may have a length greater than or equal to 100 times the thickness of the fiber. Because of this large aspect ratio, the fiber should have sufficient strength to withstand weaving processes. Also, due to the large aspect ratio, the conductivity of the fiber is preferably high to function properly as an electrode to switch the electro-optic medium applied to its surface. For example, any metals, metal alloys, conductive polymers and filaments, or composites containing these materials known in the art having sufficient conductivity may be used in the various embodiments of the present invention. Conductive materials that may be used to form the central conductive fiber include, but are not limited to copper, tungsten, aluminum, nickel, stainless steel, gold, silver, carbon fiber, and combinations thereof. Alloys of the aforementioned conductive metals may also be incorporated in the central conductive fiber. The conductive metal(s) may be plated onto the surface of a core fiber to form the conductive fiber, for example.

The thickness of the central conductive fiber is selected so that a large enough outer surface area is provided to facilitate coating with the electro-optic media, but not too large as to result in a stiff fiber that will be difficult for fabric weaving, as noted above. A larger thickness for the central conductive fiber will also facilitate aggressive cleaning of the fiber in order to expose the wire for electrical connections to a power source and/or controller, for example. Preferably, the central conductive fiber has a thickness greater than or equal to about 20 microns and less than or equal to about 250 microns.

The various embodiments of the invention allows one to make fabrics that are inherently breathable and flexible by weaving the electro-optic threads. The electro-optic fibers according to the various embodiments of the present invention may be used on standard looms and the manufacturing processes used to produce the fibers are easily scalable. Furthermore, the threads have the potential to be independently addressed, and the electro-optic media applied to each thread may contain different formulations. As a result, fabrics made using the electro-optic fibers described herein may use a plurality of different fibers. For example, one set of fibers may include an encapsulated electrophoretic media containing white and red pigments, a second set may include media containing white and green pigments, and a third set may include white and blue pigments. The fabric may be woven with the three sets of threads, such that the final configuration of the weave would allow the combination of any of the four colors in various switchable proportions and patterns to achieve a wide spectrum of selectable colors for the fabric. The electrophoretic media is not limited to two pigments. The encapsulated electrophoretic media may alternatively include three or more pigments and/or a colored dispersion fluid to allow for a potentially infinite number of optical combinations within the fabric, such as the electrophoretic media disclosed in U.S. Pat. No. 9,921, 451. By using bistable electro-optic media, low power is required to switch the material and electronic controls used to switch the material may be detachable.

Referring again to FIG. 1, the central conductive fiber 10 is preferably passivated by coating the fiber 10 with at least one dielectric layer 12a, 12b. The dielectric layer 12a, 12b is applied before and/or after the application of a layer of electro-optic media 14. By passivating the fiber 10 wire with a dielectric layer, one can prevent electrical short circuit failure that may occur when over-coating the electro-optic media 14 with another layer of conductive material 16. Gaps in the layer of electro-optic media 14 may result in a short circuit failure; therefore, incorporating additional layers of dielectric material may reduce the likelihood of this occurring.

The dielectric layers 12a, 12b may comprise materials that include, but are not limited to, polyurethane, or 100% solids, UV-curable monomers, such as acrylate products like CN3108 manufactured by Sartomer USA, LLC. The dielectric layers 12a, 12b may be applied, so as to form an annular coating about the outer surface of the conductive fiber 10. The thickness of the annular coating is preferably as thin as possible without pinhole defects, such that the dielectric layer exhibits an electrical resistance of 1e6 to 1e8 Ohms-per-square, for example. The dielectric material is preferably hydrophilic, preferably water insoluble, so that the dielectric layers are not dissolved or removed during application of the electro-optic media, which may be applied as an aqueous slurry.

As noted above, the electro-optic fiber further comprises a layer of electro-optic media 14 over the central conductive fiber 10. The electro-optic media is preferably a solid electro-optic material. Some electro-optic materials are solid in the sense that the materials have solid external surfaces, although the materials may, and often do, have internal liquid- or gas-filled spaces. Thus, the term "solid electro-optic material" may include rotating bichromal members, encapsulated electrophoretic media, and encapsulated liquid crystal media.

Electro-optic media of a rotating bichromal member type are described, for example, in U.S. Pat. Nos. 5,808,783; 5,777,782; 5,760,761; 6,054,071 6,055,091; 6,097,531; 6,128,124; 6,137,467; and 6,147,791 (although this type of media is often referred to as a "rotating bichromal ball," the term "rotating bichromal member" is preferred as more accurate since in some of the patents mentioned above the rotating members are not spherical). Such media uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the material is changed by applying an electric field thereto, thus rotating the bodies to various positions and varying which of the sections of the bodies is seen through a viewing surface. This type of electro-optic medium is typically bistable.

The terms "bistable" and "bistability" are used herein in their conventional meaning in the art to refer to electro-optic materials having first and second states differing in at least one optical property, and such that after the electro-optic material has been driven, by means of an addressing pulse of finite duration, to assume either its first or second state, after the addressing pulse has terminated, that state will persist for at least several times, for example at least four times, the minimum duration of the addressing pulse required to change the state of the electro-optic material. It is shown in U.S. Pat. No. 7,170,670 that some particle-based electrophoretic materials capable of gray scale are stable not only in their extreme black and white states but also in their intermediate gray states, and the same is true of some other types of electro-optic media. This type of media is properly called "multi-stable" rather than bistable, although for convenience the term "bistable" may be used herein to cover both bistable and multi-stable media.

The term "gray state" is used herein in its conventional meaning in the imaging art to refer to a state intermediate two extreme optical states, and does not necessarily imply a black-white transition between these two extreme states. For example, several of the E Ink patents and published applications referred to below describe electrophoretic material in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a material, and should be understood as normally including extreme optical states which are not strictly black and white, for example the aforementioned white and dark blue states. The term "monochrome" may be used hereinafter to denote a drive scheme which only drives electro-optic media to their two extreme optical states with no intervening gray states.

Another type of electro-optic media uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic media may be found in electro-wetting displays developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting media can be made bistable.

One type of electro-optic media, which has been the subject of intense research and development for a number of years, is the particle-based electrophoretic media, in which a plurality of charged particles move through a fluid under the influence of an electric field. Electrophoretic media can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291.

Numerous patents and applications assigned to or in the names of the Massachusetts Institute of Technology (MIT), E Ink Corporation, E Ink California, LLC. and related companies describe various technologies used in encapsulated electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445; and (g) Applications of displays; see for example U.S. Pat. Nos. 7,312,784 and 8,009,348.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Encapsulated electrophoretic media typically does not suffer from clustering and settling failure and provides further advantages, such as the ability to print or coat the media on a wide variety of flexible and rigid substrates. (Use of the word "printing" is intended to include all forms of printing and coating, including, but without limitation: premetered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Further, because the medium can be printed (using a variety of methods), an application utilizing the medium can be made inexpensively.

It is preferred that the electro-optic media used in the various embodiments of the present invention is provided in the form of microencapsulated electrophoretic media. For example, referring again to FIG. 1, a layer of microencapsulated electrophoretic media 14 may be coated as an annular coating around the central conductive fiber 10, for example. The annular coating may have a thickness greater than or equal to about 10 microns, preferably about 15 microns, more preferably about 20 microns, and less than or equal to about 250 microns, preferably about 100 microns, more preferably about 75 microns, and most preferably about 50 microns. As noted above, the layer of dielectric material 12a, 12b may be applied under and/or over the layer electrophoretic media 14. The microcapsule coating may be provided, for example, in the form of an aqueous coating slurry formulations comprising a microencapsulated dispersion of electrophoretic particles and a binder. The binder material may include, but is not limited to, an aqueous polymeric latex dispersion or water-soluble polymer solutions (e.g. polyvinyl alcohol, such as Kuraray Poval® CM-318, fish gelatin, and alginate). The slurry formulation may further comprises one or more additives, such as hydropropyl methyl cellulose, surfactants (e.g. Triton X-100), and co-solvents (e.g. butanol).

Following application of the slurry formulation, the layer of electrophoretic media 14 may be dried before the application of a light-transmissive conductor 16. The light-transmissive conductor 16 may be, for example, an annular coating around the layer of electro-optic media 14. The light-transmissive conductor 16 includes both a light-transmissive polymer having a volume resistivity between $1\times10^{10}$ ohm-cm and $1\times10^4$ ohm-cm and an oriented conductive element having an aspect ratio of greater than 10:1, as described previously. The term "light-transmissive" is used herein to mean that the layer thus designated transmits sufficient light to enable an observer, looking through that layer, to observe the change in optical states of the electro-optic medium, which will normally be viewed through the electrically-conductive layer; in cases where the electro-optic medium displays a change in reflectivity at non-visible wavelengths, the term "light-transmissive" should of course be interpreted to refer to transmission of the relevant non-visible wavelengths.

Figure 2:
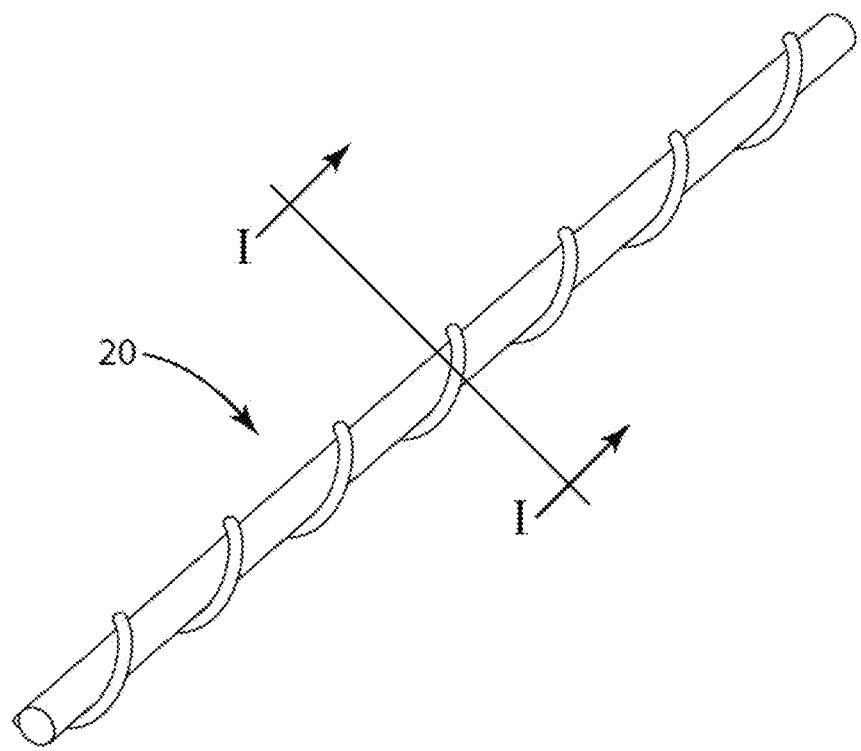
FIG. 2 is a top perspective view of an electro-optic fiber according to a second embodiment of the present invention.
Figure 3:
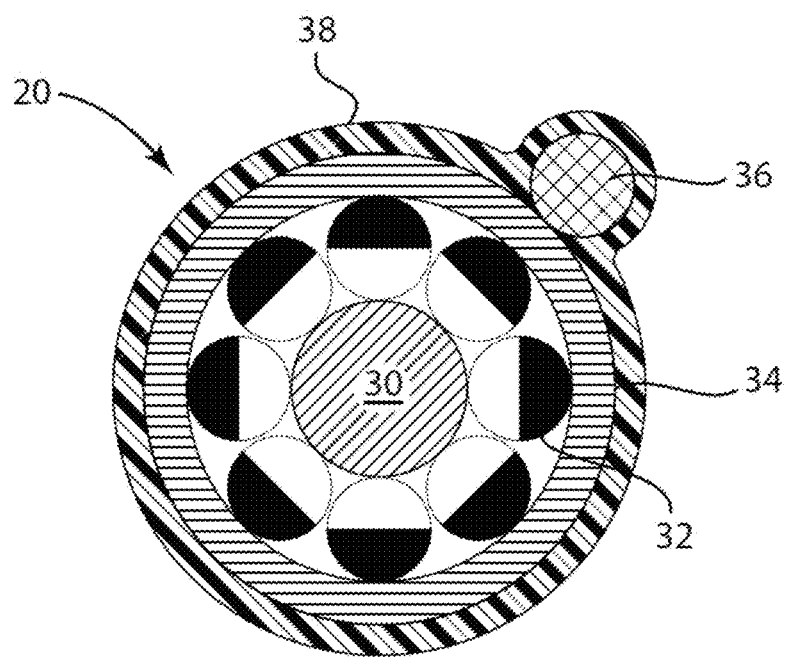
FIG. 3 is a cross-sectional view of the second embodiment illustrated in FIG. 2 along axis I-I.

Referring now to FIGS. 2 and 3, an electro-optic fiber 20 according to another embodiment of the present invention is provided. The electro-optic fiber 20 includes several of the same layers as the fiber made according to the aforementioned first embodiment. For example, the electro-optic fiber 20 includes a similar core comprising a conductive fiber 30 and similar layer of electro-optic material 32 may be coated to the outer surface of the conductive fiber 30. The previously described layers of dielectric material are optional in the second embodiment.

The electro-optic fiber 20 differs from the previously described first embodiment in that the light-transmissive conductor includes a conductive wire 36 disposed in a layer of light-transmissive polymeric material 34 with a volume resistivity between $1\times10^{10}$ ohm-cm and $1\times10^4$ ohm-cm. The conductive wire 36 may be wound in the form of a coil or helix, for example, around the inner core of the electro-optic fiber and the light-transmissive polymeric material 34 coated over the conductive wire, e.g., with dip coating, spraying, slot coating, etc. In some embodiments, a plurality of wires may be used. It should be noted that the wires need not be straight to achieve the claimed aspect ratio, e.g., 10:1 or greater.

The layer of light-transmissive polymeric material 34 may be provided in the form of an annular coating having a thickness from about 5 microns to about 200 microns, preferably to about 50 microns, wherein the thickness is preferably measured between the conductive wire and the electro-optic media. The light-transmissive polymeric material 34 may comprise a doped polymeric material as discussed previously. The composition and thickness of the light-transmissive polymeric material 34 is selected, such that light-transmissive polymeric material 34 is light-transmissive and the individual wraps of the conductive wire 36 may be spaced apart to not substantially obscure the underlying electro-optic media while still allowing electrical driving signals across the full area between wires. This phenomenon is also known as "blooming" whereby the area of the electro-optic layer which changes optical state in response to a change of voltage is larger than the area of the electrode, in this example, the area of the conductive wire in contact with light-transmissive polymeric material. The distance between the wraps of the coiled outer conductive wire may be less than 5 mm, more preferably about 1 mm or less, and most preferably about 500 microns or less.

Doped polymeric materials that may be used in the layer of semi-conductive polymeric material may include, but are not limited to, aliphatic or aromatic polyurethane latexes, polyacrylates, and poly(meth)acrylates containing a dopant, such as tetrabutylammonium hexafluorophosphate, 1-butyl-3-methylimidazolium hexafluorophosphate, polyvinyl alcohol, ionically modified polyvinyl alcohol, gelatin, polyvinyl pyrrolidone, and combinations thereof. Polymeric blends containing aromatic isocyanates are less preferred. Examples of formulations that may be included in the layer of semi-conductive polymeric material are described in U.S. Patent Application Publication No. 2017/0088758 and U.S. Pat. Nos. 7,012,735; 7,173,752; and 9,777,201.

The conductive wire applied to the surface of the semi-conductive polymeric material is preferably more compliant and has a smaller thickness than the central core wire, so that the outer conductive wire may be wrapped repeatedly around the outer surface of the semi-conductive polymeric material. The outer conductive wire preferably has a thickness of about 10 to about 100 microns and is made of a high conductive material, such as a metal. Therefore, similar to the central conductive core of the electro-optic fiber, the outer conductive wire may be made from a metal, such as copper or tungsten.

Figure 4:
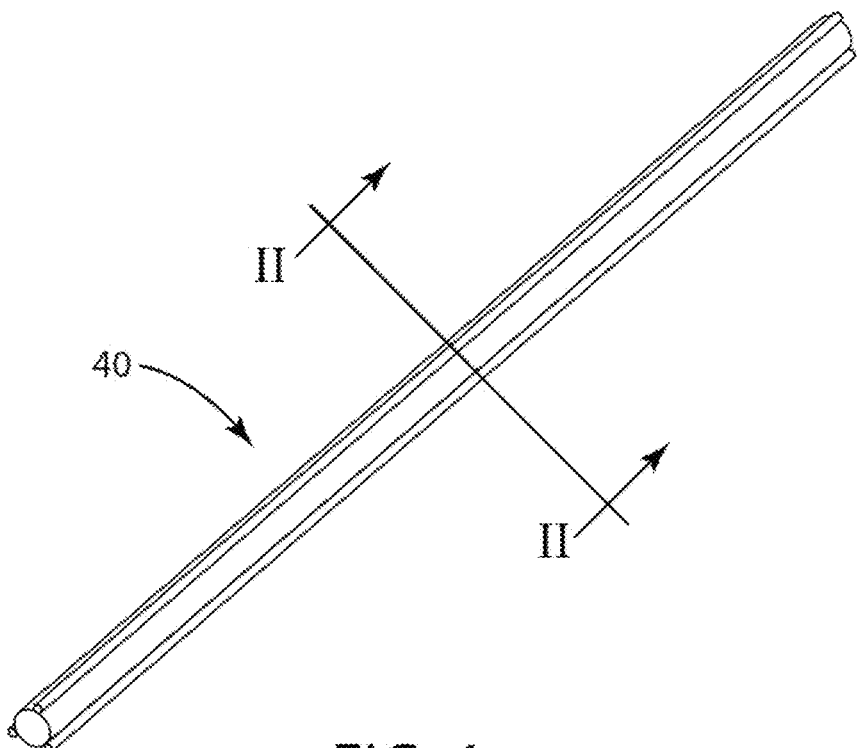
FIG. 4 is a top perspective view of an electro-optic fiber according to a third embodiment of the present invention.
Figure 5:
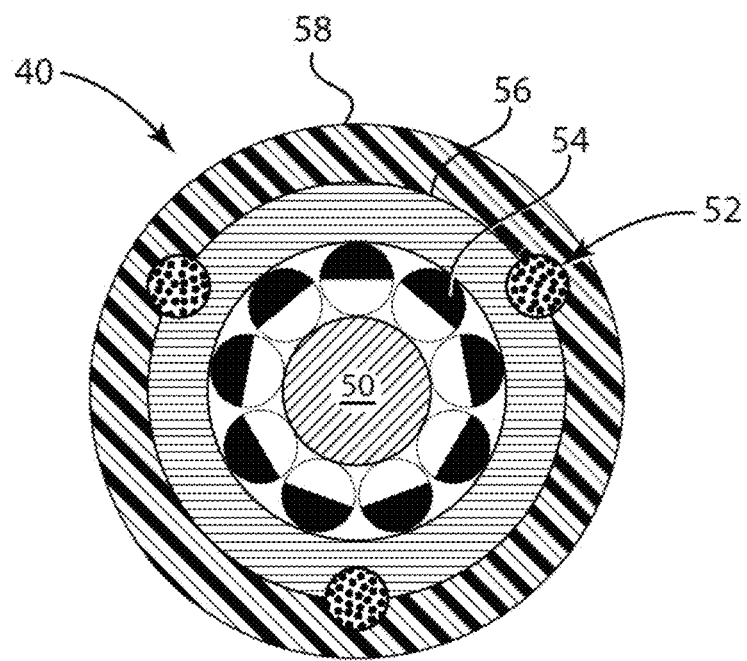
FIG. 5 is a cross-sectional view of the third embodiment illustrated in FIG. 5 along axis II-II.

In a third embodiment of the present invention illustrated in FIGS. 4 and 5, the electro-optic fiber 40 comprises the same features as the aforementioned second embodiment. The electro-optic fiber 40 may comprise a central conductive core 50, a layer of electro-optic medium 52 applied to outer surface of the core 50, and a layer of light transmissive conductor 56 applied to the outer surface of the electro-optic medium 52.

The third embodiment differs from the second embodiment in that a plurality of outer conductive wires 52 are embedded in the outer surface of the layer of light-transmissive conductor 56. Rather than being wound about the outer surface, the outer conductive wires 52 have been applied, such that they are substantially parallel to the inner conductive core 50. The outer conductive wire may be added with multiple spools which unwind parallel to the fiber. The fiber may be advanced past the spools and the spools unwind wire under light tension as the fiber is advanced. The spools would not need to rotate around the fiber.

All of the various embodiments of the present invention may further comprise an outer light-transmissive protective layer, such as layer 38 in FIG. 3 or layer 58 in FIG. 5. The layer of protective material may be configured to serve as a mechanical and environmental protection layer for the underlying materials. The protective materials may comprise a polymeric material, for example, such as polyvinyl alcohol, crosslinked gelatin, acrylates, urethane acrylate co-polymers, and blends thereof. In order to provide a more water-resistant protective layer, the polymeric material may include 100% solids radiation cured hard-coat materials, such as a solvent borne hard coat material like DCU2002 manufactured by PPG Industries Inc., a solvent borne high solids polyurethane automotive clear hard coat material.

The coated layers in the various embodiments of the present invention, such as the layers of dielectric material, electro-optic media, outer conductive material, semi-conductive polymeric material, and protective material, may be applied via a variety of printing methods, such as those noted above, including, but not limited to, dip coating, electrodeposition, powder coating, spray coating, or extrusion.

Figure 6A:
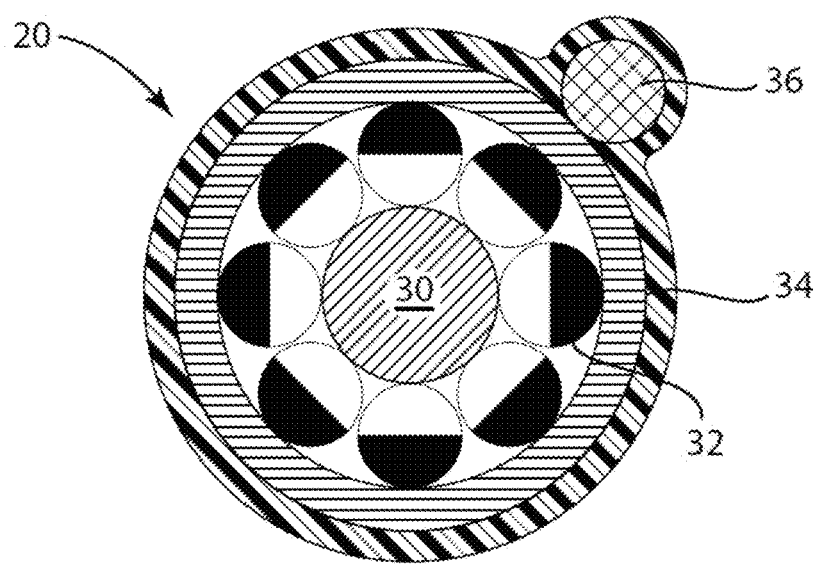
FIG. 6A is the cross-sectional view of the second embodiment illustrated in FIG. 2 in a first optical state.
Figure 6B:
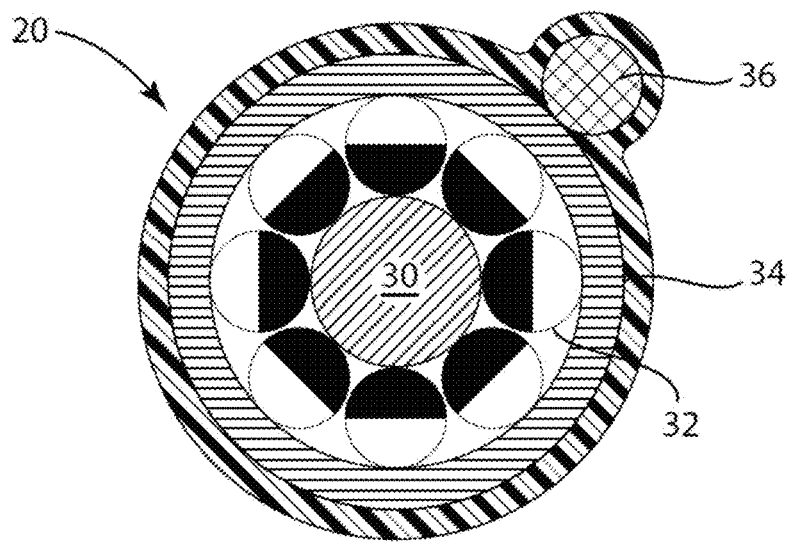
FIG. 6B is the cross-sectional view of the second embodiment illustrated in FIG. 2 in a second optical state.

In order to switch the optical state of the electro-optic medium of the electro-optic fiber, a voltage is applied between the central conductive core and the outer conductor of the fiber. If the electro-optic media comprises an electrophoretic media, the applied electric field causes the electrophoretic particles within the encapsulated dispersion to move either towards or away from the central conductive core. For example, FIGS. 6A and 6B illustrate an electro-optic fiber 20 according to the second embodiment of the present invention in two different optical states. The layer of electro-optic media 32 may be filled with an electrophoretic dispersion containing a white fluid and positively charged black particles, for example. As shown in FIG. 6A, when the voltage applied to the central conductive core fiber 30 and outer conductive wire 36 is such that the central conductive core fiber 30 is positive relative to the outer conductive wire 36, the positively charged black particles will be driven away from the central conductive core fiber 30, i.e. towards the outer circumferential view side of the fiber, resulting in a dark optical state for the fiber 20. When the polarity is reversed, as illustrated in FIG. 6B, the charged black particles are driven towards the central conductive core fiber 30, so that the black particles are obscured by the white dispersion fluid, resulting in a white optical state of the fiber 30.

While the light-transmissive conductors with directional conductivity are useful for the creation of elongate cylindrical articles, such as fibers, the light-transmissive conductors may also be used to form a variety of structures with high-aspect ratios, such as ribbons, rectangles, and stripes.

A variety of constructions of light-transmissive conductors 70 are shown in FIGS. 7A-7D. In a simple embodiment, shown in FIG. 7A, the light-transmissive conductor 70 includes a light-transmissive polymer 72, having a volume resistivity between $1 \times 10^{10}$ ohm-cm and $1 \times 10^4$ ohm-cm, and a plurality of wires 74, that traverse the length of the light-transmissive conductor 70. The wires may be silver, copper, aluminum, nickel, zinc, gold, steel, or any combination thereof. Because the longitudinal resistivity is dominated by the conductivity of the wires, the overall conductivity along the length of the light-transmissive conductor is less than $1 \times 10^{-3}$ Ohm-cm, e.g., less than $1 \times 10^{-6}$ Ohm-cm. However, the transverse conductivity is dominated by the volume resistivity of the light-transmissive polymer, thus the transverse conductivity is typically also on the order of $1 \times 10^{10}$ ohm-cm to $1 \times 10^4$ ohm-cm. Depending upon the amount of doping, etc., the volume resistivity of the light-transmissive polymer may approach $1 \times 10^7$ ohm-cm to $1 \times 10^5$ ohm-cm, which empirically seems to be sufficient to minimize self-erasing in an electrophoretic display, i.e., as discussed in FIG. 9, below.

Figure 7A:
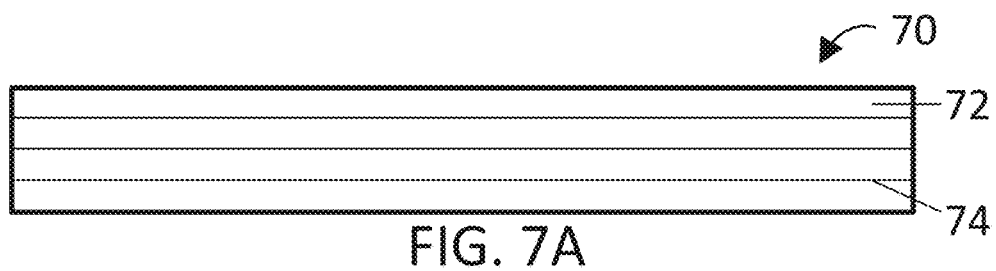
FIG. 7A shows an exemplary light-transmissive conductor with directional conductivity.
Figure 7B:
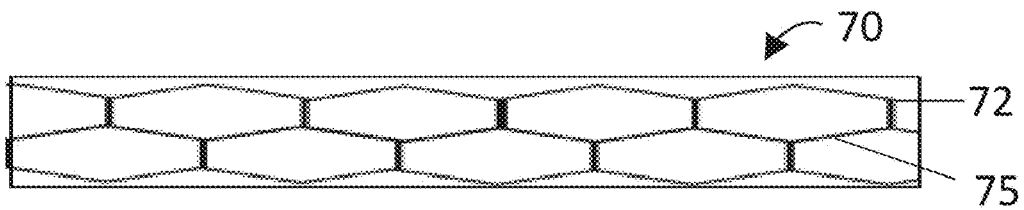
FIG. 7B shows an exemplary light-transmissive conductor with directional conductivity.
Figure 7C:
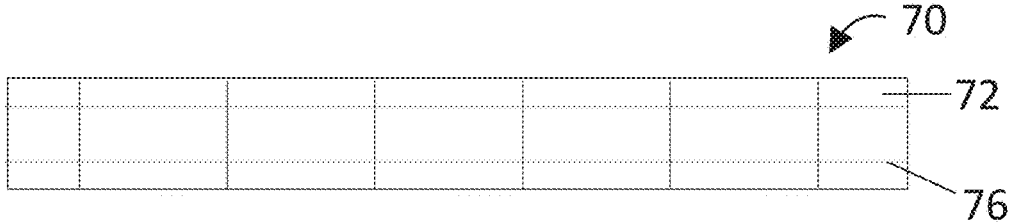
FIG. 7C shows an exemplary light-transmissive conductor with directional conductivity.

Alternative constructions may include elongated polygon structures 75, such as hexagons, as shown in FIG. 7B, provided that the elongated polygon structure has a preferential direction of conductivity. The scale of the elongated polygon structure is not limited in that for a large format device, a small chicken wire structure might be suitable down to individual atomic sheets such as graphene. Again, the polygon structures may include silver, copper, aluminum, nickel, zinc, gold, steel, or any combination thereof. In some embodiments, the elongate polygon structures 75 may comprise multiple types of materials with a more conductive material running the length of the light-transmissive conductor 70, while an different, less conductive material runs the width. In a similar fashion, a grid 76 can be used as the directional conductor by selecting materials with different conductivities for different portions of the grid 76. Polygon structures 75 and grids 76 provide more structural stability in light-transmissive conductors 70, thus allowing them to be flexed in multiple directions.

Figure 7D:
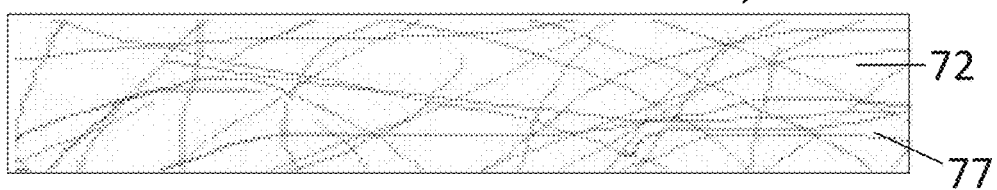
FIG. 7D shows an exemplary light-transmissive conductor with directional conductivity.
Figure 8:
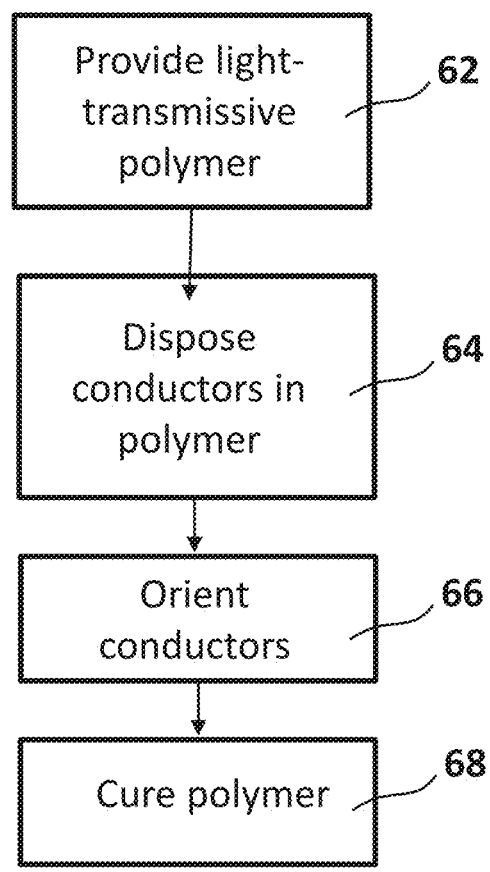
FIG. 8 shows a flow chart for fabrication of a light-transmissive conductor with directional conductivity.

In yet another embodiment, shown in FIG. 7D, the oriented conductive element can be constructed from conductive flakes, threads, slivers, whiskers, nanowires, nanotubes, or combinations thereof, wherein the contingent conductors are oriented to achieve an aspect ratio greater than 10:1. For example, a light-transmissive polymer 72 may be loaded with silver whiskers 77 and the mixture is mechanically actuated to cause the silver whiskers 77 to roughly align along the axis of the light-transmissive conductor 70, thereby producing an directionality in the conductivity. After the conductors 77 have been oriented, the light-transmissive polymer 72 maybe cured or cross-linked to lock the conductors into their preferred orientation. The conductors may include carbon nanotubes, silver, tungsten, iron, copper, nanoparticles, metallic grids, or graphene The method for creating an light-transmissive conductors 70 of FIG. 7D is shown in FIG. 8, including providing the light-transmissive polymer 72 at step 62, disposing the conductors 77 in the light-transmissive polymer 72 at step 64, orienting the conductors 77 with an external stimulus in step 66, and optionally curing the light-transmissive polymer 72 at step 68. Other methods of aligning the component conductors may include applying electric or magnetic fields to stimulate alignment. Magnetic fields are particularly useful for aligning magnetic or paramagnetic materials, such as iron, tungsten, and aluminum. In some instances, compound materials, such as silver threads, spun with iron, may be used to allow for easier alignment of the conductors 77. In some embodiments, a larger conductor 77 may be coated with, e.g., iron dust to facilitate alignment in the preferred direction, e.g., with a magnetic field. The light-transmissive polymer 72 may be cured with heat, or pressure, or the light-transmissive polymer 72 may include a cross-linker that is activated, e.g., with heat or UV light.

Figure 9:
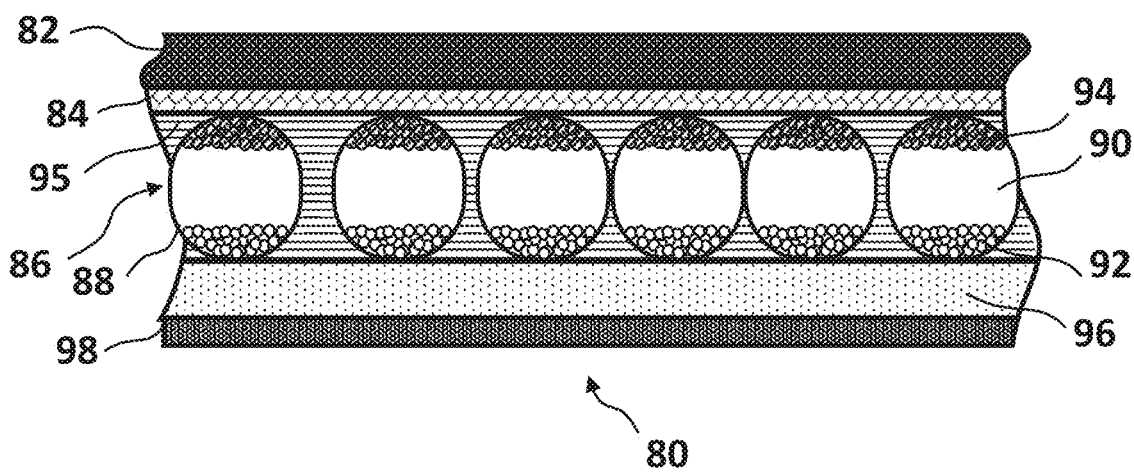
FIG. 9 is a schematic cross-section through a basic front plane laminate (80) of an electro-optic display having a light-transmissive conductor with directional conductivity as the top electrode.

Light-transmissive conductors of the invention may be used as the top electrode in an electro-optic display, as shown in FIG. 9. FIG. 9 is a schematic cross-section through a basic front plane laminate 80 of an electro-optic display having a light-transmissive conductive layer of the invention. Typically, the light-transmissive electrically-conductive layer 84 will be carried on a light-transmissive substrate 82, which is preferably flexible, in the sense that the substrate can be manually wrapped around a drum (say) 10 inches (254 mm) in diameter without permanent deformation. The substrate 82 will be typically be a polymeric film, and will normally have a thickness in the range of about 1 to about 25 mil (25 to 634 µm), preferably about 2 to about 10 mil (51 to 254 µm). The substrate 82 forms the viewing surface of the final display and may have one or more additional layers, for example, a protective layer to absorb ultra-violet radiation, barrier layers to prevent ingress of moisture, or anti-reflection coatings.

The light-transmissive conductive layer 84 comprises a light-transmissive polymer having a volume resistivity between $1\times10^{10}$ ohm-cm and $1\times10^4$ ohm-cm and an oriented conductive element having an aspect ratio of greater than 10:1, as discussed above. A layer of electro-optic medium 86 is in electrical contact with the light-transmissive conductive layer 84. However, in some embodiments, a layer of optically clear adhesive (not shown) is also present between the light-transmissive conductive layer 84 and the layer of electro-optic medium 86. The electro-optic medium 86 shown in FIG. 9 is an opposite-charge dual particle encapsulated electrophoretic medium having a plurality of microcapsules, each of which comprises a capsule wall 88 containing a hydrocarbon-based liquid 90 in which are suspended negatively charged white particles 92 and positively charged black particles 94. The microcapsules are retained within a binder 95. Upon application of an electrical filed across the electro-optic layer 86, the white particles 92 move to the positive electrode and the black particles 94 move to the negative electrode, so that the electro-optic layer 86 appears, to an observer viewing the display through the substrate 82, white or black depending upon whether the electric field across the electro-optic layer 84 is positive or negative relative to the backplane at any point within the final display.

The front plane laminate 80 as shown in FIG. 9 further comprises a layer of lamination adhesive 96 adjacent the electro-optic medium layer 86 and a release sheet 98 covering the adhesive layer 96. The release layer 98 is peeled from the adhesive layer 96 and the adhesive layer is laminated to a backplane to form the final electro-optic display. The two-phase conductive layer of the present invention may be the front electrode of an electro-optic display, which is the electrode located on the side closest to the viewing surface. In an electro-optic display that is fully light-transmissive or has two viewing surfaces, the two-phase conductive layer of the present invention may be both the front and back electrodes. The backplane may be, for example, a single electrode material, such as a graphite electrode, a metal foil, or a conductive film such as PET-ITO. The backplane may be a segmented display, a passive matrix display, or an active matrix display. In some instances, the backplane will include an active matrix of thin-film-transistors to control a voltage on a plurality of pixel electrodes.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties.

The invention claimed is:

1. A color-changing fiber comprising:
   a central conductive element;
   a layer of electro-optic media surrounding the central conductive element, the layer of electro-optic media comprising pigment particles in a solvent enclosed in microcapsules dispersed in a polymer binder; and
   an outer layer of light-transmissive conductor, the light-transmissive conductor including:
      a light-transmissive polymer doped with a salt, a polyelectrolyte, a polymer electrolyte, or a solid electrolyte and having a volume resistivity between $1\times10^7$ ohm-cm and $1\times10^5$ ohm-cm, and
      an oriented conductive element having an aspect ratio of greater than 10:1 (length: width).

* * * * *